United States Patent [19]

Watvedt

[11] Patent Number: 4,603,745
[45] Date of Patent: Aug. 5, 1986

[54] PLOUGH REVERSING MECHANISM

[75] Inventor: Jφrn Watvedt, Kvernaland, Norway

[73] Assignee: Kverneland A/S, Kvernaland, Norway

[21] Appl. No.: 687,155

[22] Filed: Dec. 28, 1984

[51] Int. Cl.$^4$ .................. A01B 63/22; A01B 63/34
[52] U.S. Cl. .................................. 172/212; 172/225
[58] Field of Search ............. 172/224, 225, 212, 206, 172/204, 291, 290, 286, 285, 799

[56] References Cited

U.S. PATENT DOCUMENTS

| | | | |
|---|---|---|---|
| 2,057,089 | 10/1936 | De Millar | 172/799 X |
| 3,174,556 | 3/1965 | Knapp et al. | 172/225 X |
| 3,524,509 | 8/1970 | Richey | 172/212 |
| 3,627,058 | 12/1971 | Johannsen | 172/206 |
| 4,067,396 | 1/1978 | Watts | 172/225 X |
| 4,207,951 | 6/1980 | Wilcox et al. | 172/225 |
| 4,304,303 | 12/1981 | Lange | 172/10 X |

FOREIGN PATENT DOCUMENTS

| | | | |
|---|---|---|---|
| 2376606 | 9/1978 | France | 172/285 |
| 2526262 | 11/1983 | France | 172/225 |
| 2902554 | 12/1979 | Norway | 172/225 |
| 1111901 | 5/1968 | United Kingdom | 172/211 |
| 1222058 | 2/1971 | United Kingdom | 172/225 |
| 2013461 | 8/1979 | United Kingdom | 172/225 |

*Primary Examiner*—Richard T. Stouffer
*Assistant Examiner*—Terrence L. B. Brown
*Attorney, Agent, or Firm*—Schwartz, Jeffery, Schwaab, Mack, Blumenthal & Evans

[57] ABSTRACT

Reversing mechanism, particularly for semi-reversible ploughs, where the reversing mechanism includes hydraulic reversing cylinders (10, 11). The reversing mechanism, or device (5) to be reversed, includes a lifting arm (8) which at its one end is rotatably supported at a point (9) which the reversing mechanism turns about, and which at its other end is fastened to the device (5) to be reversed. The reversing cylinders (10, 11) have approximately the same volume and approximately the same length of stroke and are affixed symmetrically to the lifting arm (8). The piston rods of the reversing cylinders (10, 11) are rotatably attached (15, 19) with one end of a pressure arm (17, 18) whose other end is rotatably fixed to the point (9) about which the reversing mechanism rotates. Each reversing cylinder (10, 11) is single-acting and arranged to turn the lifting arm (8) approximately 110 degrees from horizontal position before the reversing cylinder (10, 11) has attained full length of stroke and the piston rod of the non-activated reversing cylinder (11, 10) is brought to abut against the abutment screw (21, 16) and brake the remainder of the reversing operation, which takes place with the aid of gravity. Two identical double-acting hydraulic steering cylinders (24, 25) are connected in parallel with the reversing cylinders (10, 11) and are thus arranged automatically to adjust, for example, the back wheel (4) of a semi-reversible plough when the reversing mechanism is activated.

7 Claims, 6 Drawing Figures

PLOUGH REVERSING MECHANISM

FIELD OF THE INVENTION

This invention concerns a reversing mechanism, particularly for semi-reversible ploughs. Such ploughs usually have 4–8 double plough shares fixed permanently or rotatably to a plough frame. The plough frame is rotatably fixed to a carriage which at its front edge is arranged to be hung on the tractor's three-point mounting, and which at the back is equipped with a back wheel which serves both as steering wheel and depth wheel.

RELATED ART

Several disadvantages of the known semi-reversible ploughs relate to the reversing mechanism which turns the plough frame 180 degrees in the carriage when the direction in which one is ploughing shall be swapped from left to right, or vice versa. The known reversing mechanisms of this type have one or two double-acting hydraulic cylinders which are attached to the plough carriage, to a tower on the carriage, or to a special arm which extends out from the carriage. These reversing mechanisms are characterized by having many, in part complicated, components, and by the outer measurements being large, so that the distance between the tractor and plough is large, which brings with it technical ploughing disadvantages.

A good reversing mechanism of this kind must be able, inter alia, to use the tractor hydraulics, turning the plough evenly and swiftly and preventing the reversing mechanism from being exposed to large internal forces. Furthermore, the back wheel of the plough should be arranged to be steered by hydraulic steering cylinders which are hydraulically tied to the reversing mechanism in such a way that the back wheel is automatically adjusted correctly upon reversal of the plough. The reversal must also be stoppable at any point without pressure from the weight of the plough having an unfavourable effect on the steering cylinders of the back wheel and moving these uncontrollably, causing pressure build-up in the hydraulic system.

SUMMARY OF THE INVENTION

The objective of this invention is to provide a reversing mechanism, particularly for semi-reversible ploughs, in which the above-mentioned disadvantages are eliminated, and which at the same time satisfies the above-mentioned requirements for a good reversing mechanism.

This objective is achieved by a reversing mechanism with the features stated in the following claims.

BRIEF DESCRIPTION OF THE DRAWINGS

An example of the execution of the invention is shown on the drawing, where.

DETAILED DESCRIPTION OF THE PREFERRED EMBODIMENTS

Figure 1:
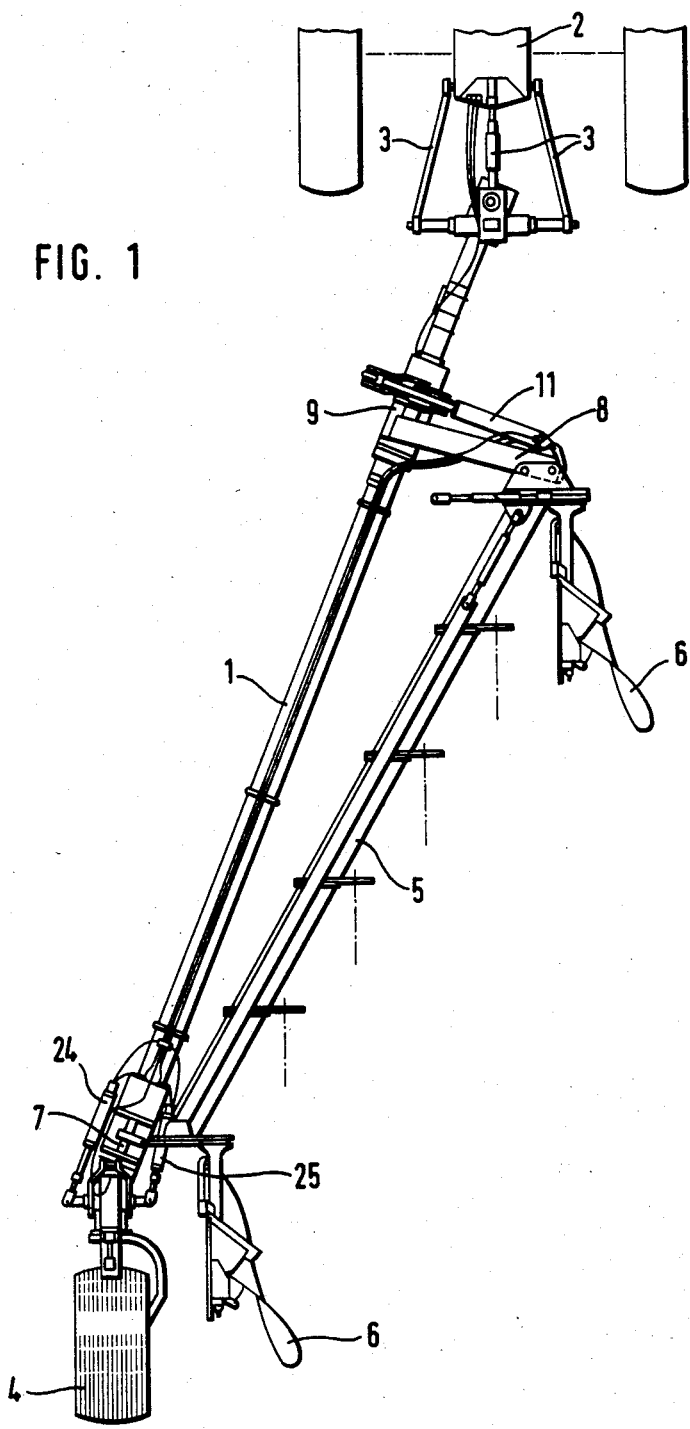
FIG. 1 shows, from above, a semi-reversible plough with reversing mechanism according to the invention.
Figure 2:
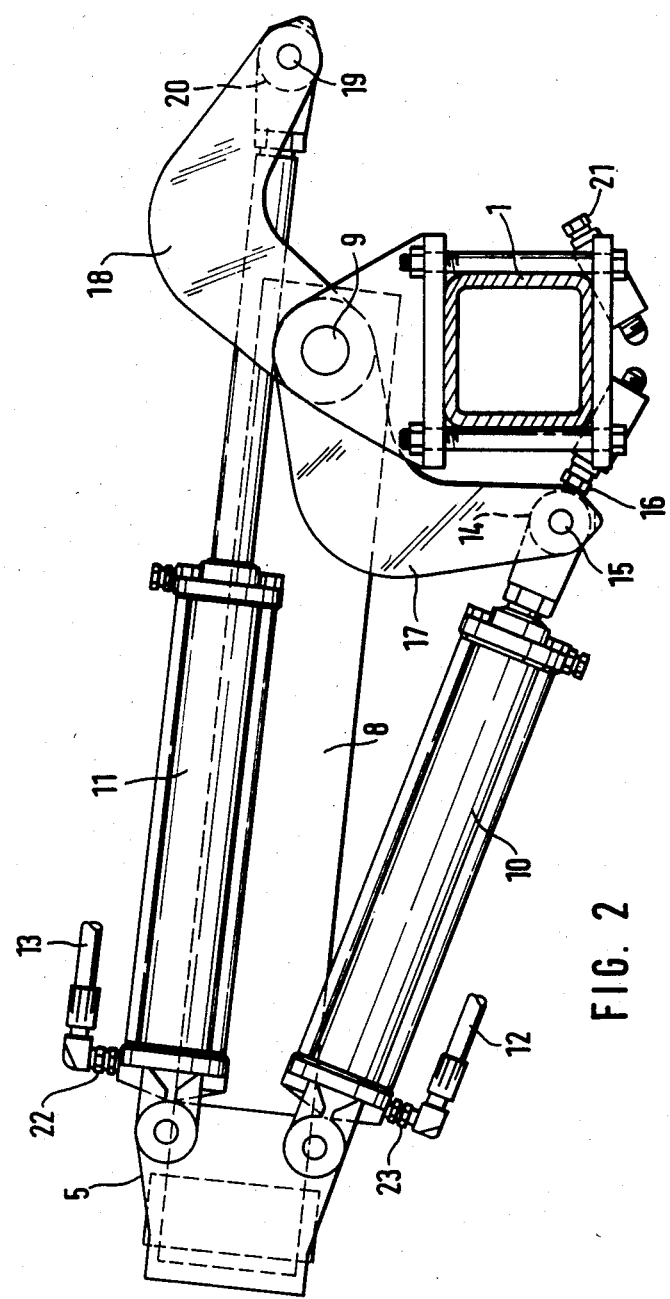
FIGS. 2, 3, 4 and 5 show in larger scale, from the front, the reversing mechanism at four stages of a reversing operation.

In FIG. 1 reference no. 1 indicates the semi-reversible plough carriage which at the front is suspended from the three-point mounting 3 of a tractor 2, and which at the back is equipped with a back wheel 4 which serves both as steering wheel and depth wheel. A plough frame 5 to which is rotatably attached a number of double plough shares 6 is arranged at the back edge so as to be able to turn about a shaft 7 fastened to the carriage 1. The uppermost lying plough share of the double plough shares 6 is, for the sake of clarity, not drawn on the drawing. At its front edge, the plough frame 5 is attached to one end of a lifting arm 8, whose other end is rotatably supported on a shaft 9 fastened to carriage 1. As shown in FIG. 2, the plough frame 5 may, with the aid of two single-acting hydraulic reversing cylinders 10, 11 which are rotatably attached to lifting arm 8 and connected to the tractor 2 hydraulics, be turned approximately 180 degrees to and fro about the shafts 7, 9 mentioned.

Figure 3:
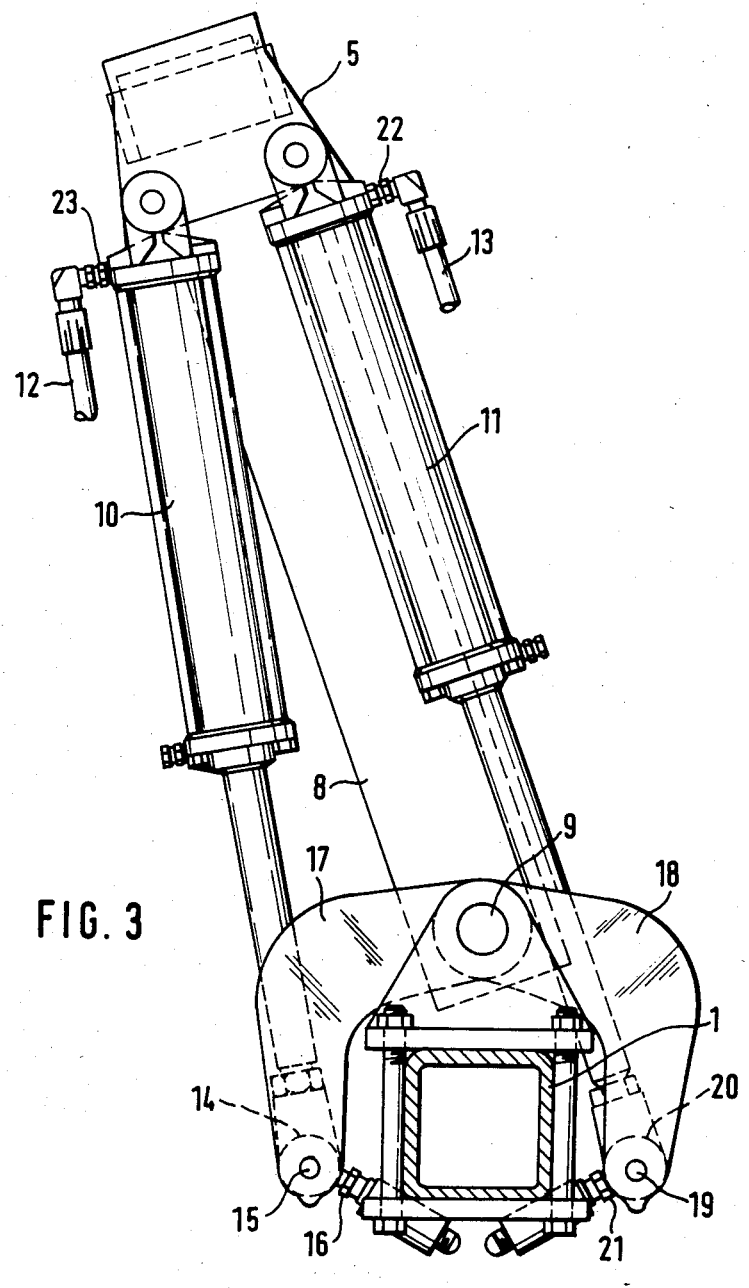
Figure 5:
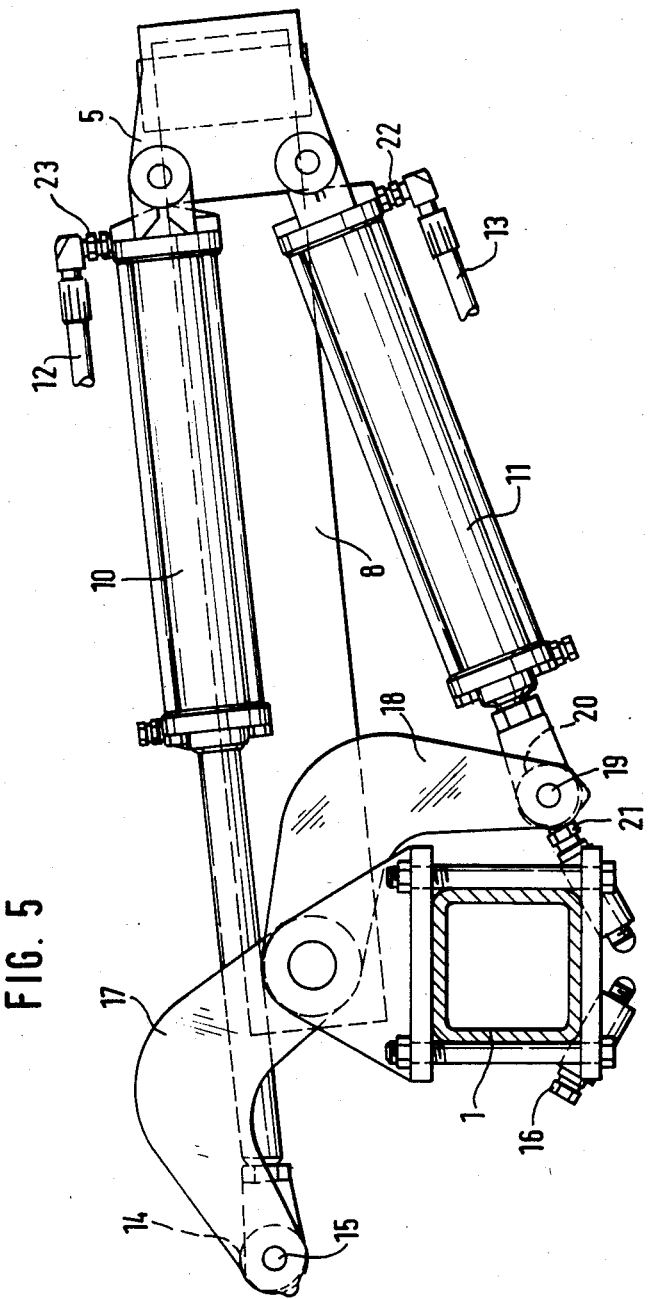

When plough frame 5 is to be turned from the working position as shown in FIG. 2 to the working position as shown in FIG. 5, pressure is applied to cylinder 10 via hose 12, and cylinder 11 is connected for return to the tractor 2 hydraulics via hose 13. The force from cylinder 10 acts via an abutment ring 14, which is rotatably attached to the cylinder 10 piston rod with aid of a bolt 15, against an abutment screw 16 which is fixed to the carriage 1 and provides a moment which turns lifting arm 8, and thus the plough frame 5, about the shaft 9. A pressure arm 17, of which one end is rotatably supported on the cylinder 10 piston rod with the aid of the bolt 15, is at its other end rotatably supported on shaft 9. A corresponding pressure arm 18, one end of which is rotatably supported on the cylinder 11 piston rod with the aid of bolt 19, is at its other end rotatably supported on shaft 9. An abutment ring 20 is rotatably attached to the cylinder 11 piston rod with the aid of the above-mentioned bolt 19. When pressure from the cylinder 10 causes lifting arm 8 to rotate about shaft 9, pressure arm 18 is simultaneously caused to rotate about shaft 9, so that cylinder 11 will remain at rest and follow lifting arm 8 until the latter has turned so far that the abutment ring 20 on the cylinder 11 piston rod abuts against the abutment screw 21 fixed to the carriage 1, as shown in FIG. 3, and the piston rod is pressed into the cylinder 11, upon which oil will flow out from the cylinder 11 via a choke valve 22 and hose 13 to return to the tractor 2 hydraulics.

Figure 4:
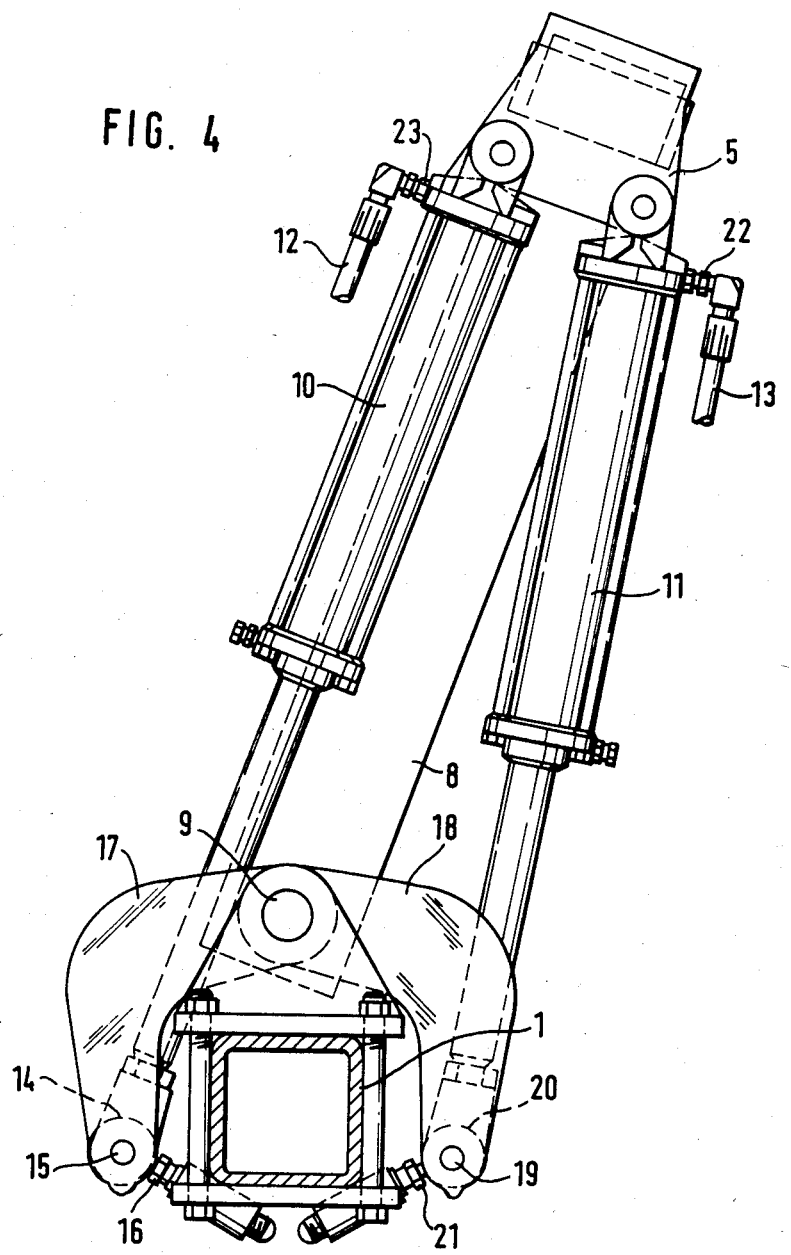

Cylinder 10 turns the lifting arm 8 and thus the plough frame 5 further until the center of gravity of the plough frame 5 passes a vertical line though shaft 9, after which both the weight of the plough frame 5 and the cylinder 10 will turn the lifting arm 8 further until the cylinder 10 has traversed its full length of stroke, having turned approximately 110 degrees, and the abutment ring 14 on its piston rod departs from the abutment screw 16, as shown in FIG. 4.

The weight of the plough frame 5 will turn the lifting arm 8 further with the cylinder 11 as counter-force, as the oil which is pressed out of cylinder 11 is choked by choke valve 22 before flowing onward through flowline 13 to return to the tractor 2 hydraulics. The lifting arm 8 turns onward in this way until the piston rod is completely pressed into cylinder 11 and the plough frame 5 rests against the abutment screw 21 on the carriage 1, as shown in FIG. 5.

Because a choke valve 23 is also provided between the cylinder 10 and the hydraulic line 12, and because both the cylinders 10, 11 and the pressure arms 17, 18 are mutually identical and installed symmetrically in relation to lifting arm 8, it will be apparent without further ado that, when plough frame 5 is to be turned in the reverse direction, i.e. from the working position shown in FIG. 5 to the working position shown in FIG. 2, this occurs in the same way as described above, but in the reverse sequence.

Figure 6:
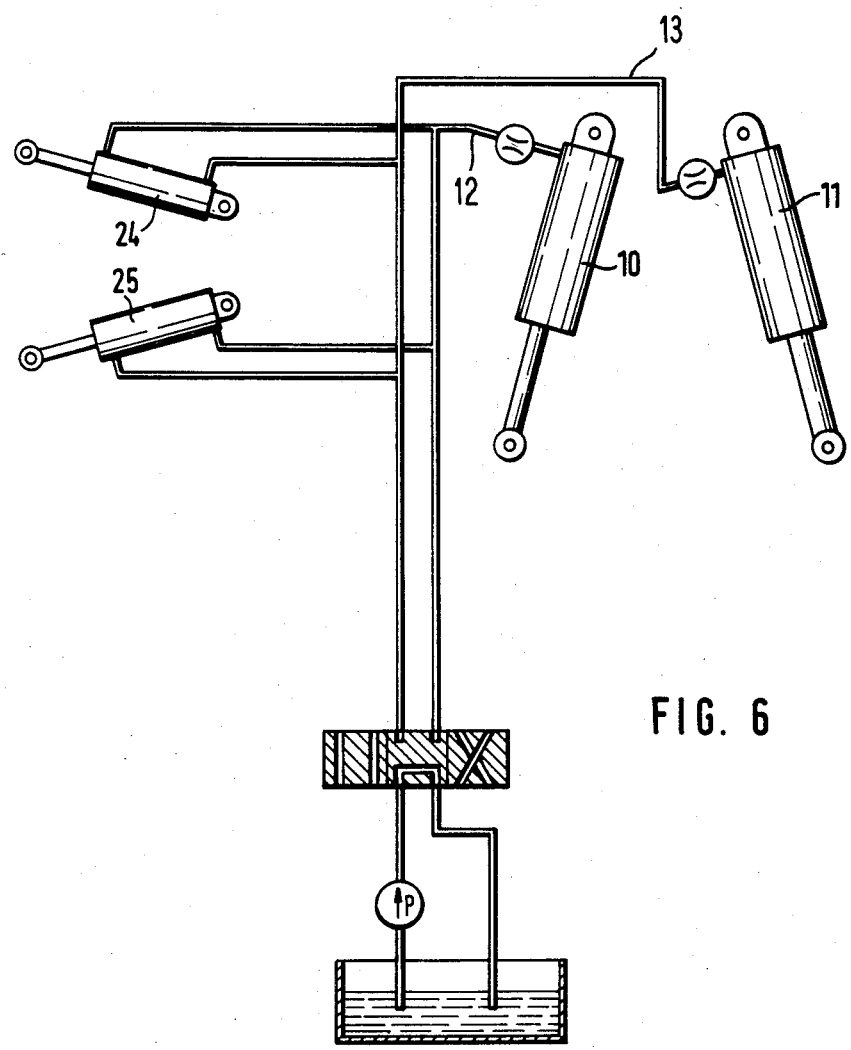
FIG. 6 shows the hydraulic diagram for the reversing mechanism according to the invention.

On the carriage 1 of the semi-reversible plough are attached two identical, double-acting hydraulic steering cylinders 24, 25 which are connected in parallel with the reversing cylinders 10, 11 as shown in FIG. 6, and which thereby are automatically arranged to adjust the back wheel 4 to the correct position upon reversing the plough, and hold the back wheel in place during ploughing. When reversal of the plough is initiated by pressurizing reversing cylinder 10 or 11, respectively, the two double-acting hydraulic steering cylinders 24, 25 will simultaneously be pressurized, as shown in FIG. 6, and traverse their full length of stroke in opposite directions and steer the back wheel 4 from one extreme position to the opposite extreme position.

Any pause in the reversal of the plough from a working position equal to 0 degrees to approximately 90 degrees will cause the weight of the plough frame 5 to apply pressure to the same side of the hydraulic system as was the original pressure side, so that the back wheel 4 is held in its new position.

Upon a pause in the reversal between approximately 90 and 110 degrees, the weight of the plough frame 5 will apply pressure to the original return side of the hydraulic system, and steering cylinders 24, 25 will return to the position they had before the reversal started, and thus swing the back wheel 4 back again, as return oil from the steering cylinders 24, 25 enters into the reversing cylinder 10, respectively 11, which was pressurized when reversal started, and consequently this reversing cylinder will turn lifting arm 8 further until steering cylinders 24, 25 have returned to their original position, or until lifting arm 8 has rotated to approximately 110 degrees and the initially activated reversing cylinder 10, respectively 11, has traversed its full length of stroke. This causes no pressure build-up and consequential unfortunate effects on the reversing mechanism, because the oil quantity in the hydraulic system is constant, because the reversing cylinders 10 and 11 are single-acting.

Upon a pause in the reversal between approximately 110 and approximately 180 degrees, corresponding to accomplished reversal, the weight of the plough frame 5 will act on the reversing cylinders 10, 11 and apply pressure to the original return side of the hydraulic system, and this pressure will propagate via steering cylinders 24, 25 to original pressure side of the initially activated reversing cylinder 10, respectively 11, but because the initially activated reversing cylinder 10, respectively 11, has traversed its full length of stroke, this pressure will not move the steering cylinders 24, 25, because return oil from these cannot enter into the initially activated reversing cylinder 10, respectively 11, because this has already traversed its full length of stroke. This also locks the movement of steering cylinders 24, 25.

Because not only reversing cylinders 10, 11 but also pressure arms 17, 18 are mutually identical and are installed directly onto lifting arm 8 and symmetrically in accordance with the invention, an ideal reversing function is achieved with a minimum of components.

Because reversing cylinders 10, 11 are single-acting, they only provide force in the direction in which one wishes to reverse, and only during the first part of the reversing operation, so that only the weight of the plough frame 5 and in part the weight of the reversing mechanism rest against the abutment screw 16, respectively 21, with a minimum of mechanical forces resulting.

The single-acting reversing cylinders 10, 11 cause no undesirable pressure build-up even if the reversing operation is interrupted.

The compact reversing mechanism according to the invention provides minimal distance between the plough and the tractor, which again yields technical ploughing benefits.

It will be apparent without further ado that the reversing mechanism according to the invention can be utilized with advantage for other purposes than that described in the above-mentioned example of execution.

I claim:

1. A hydraulic reversing mechanism for a reversible plough comprising:
   (a) a plough frame;
   (b) a lifting arm having first and second ends, said first end being connected to said plough frame;
   (c) a shaft attached to said second end of said lifting arm;
   (d) first and second hydraulic cylinders, each having a first end attached to said first end of said lifting arm, and each having a piston rod movably disposed at a second end thereof; and
   (e) first and second pressure arms rotatably attached at a first end to said first and second piston rods, respectively, and rotatably at a second end to said shaft;
   (f) third and fourth hydraulic cylinders connected in parallel with said first and second hydraulic cylinders, respectively, for adjusting the position of a rear wheel of said plough frame as a function of the position of said first and second hydraulic cylinders;
   (g) whereby said first hydraulic cylinder initiates rotation of said lifting arm by extending said first piston rod from a retracted position to an extended position, and whereby said second hydraulic cylinder completes rotation of said lifting arm by retracting said second piston rod from an extended position to a retracted position.

2. The hydraulic reversing mechanism of claim 1, further comprising first and second abutment means disposed on said plough frame such that said first ends of each of said first and second pressure arms contact said first and second abutment means, respectively, upon a first and second predetermined amount of rotation of said lifting arm.

3. The hydraulic reversing mechanism of claim 1, wherein each of said piston rods are of a length sufficient to rotate said lifting arm at least approximately 90° upon moving from a fully retracted position to a fully extended position.

4. The hydraulic reversing mechanism of claim 1, wherein each of said piston rods are of a length sufficient to rotate said lifting arm approximately 110°.

5. The hydraulic reversing mechanism of claim 1, wherein each of said piston rods are of a length sufficient to rotate said lifting arm between approximately 90° and 110°.

6. The reversing mechanism of claim 1, wherein said first and second hydraulic cylinders are single-acting hydraulic cylinders.

7. The reversing mechanism of claim 1, wherein said third and fourth hydraulic cylinders are double-acting hydraulic cylinders.

* * * * *